(12) United States Patent
Venable, Sr.

(10) Patent No.: US 8,806,567 B1
(45) Date of Patent: Aug. 12, 2014

(54) USING ENCODED IDENTIFIERS TO PROVIDE RAPID CONFIGURATION FOR NETWORK ACCESS

(75) Inventor: Jeffrey C. Venable, Sr., Union City, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 571 days.

(21) Appl. No.: 12/969,941

(22) Filed: Dec. 16, 2010

(51) Int. Cl.
*H04L 29/00* (2006.01)

(52) U.S. Cl.
USPC .................................. 726/1; 340/8.1; 726/5

(58) Field of Classification Search
USPC ............................................ 340/8.1; 726/5
See application file for complete search history.

(56) References Cited

U.S. PATENT DOCUMENTS

| 2006/0011728 | A1* | 1/2006 | Frantz et al. | 235/462.46 |
| 2008/0091616 | A1* | 4/2008 | Helwin et al. | 705/72 |
| 2011/0264527 | A1* | 10/2011 | Fitzpatrick et al. | 705/14.55 |
| 2013/0015954 | A1* | 1/2013 | Thorne et al. | 340/8.1 |

OTHER PUBLICATIONS

Jerry Gao, VijayKulkarni, Himanshu Ranavat, Lee Chang, Hsing Mei/ A 2D Barcode-Based Mobile Payment System/ 2009/ pp. 1-10.*
Tasos Falas, Hossein Kashani/Two-Dimensional Bar-code Decoding with Camera-Equipped Mobile Phones/2007/p. 1-4/.*

* cited by examiner

*Primary Examiner* — Brandon Hoffman
*Assistant Examiner* — Michael D Anderson
(74) *Attorney, Agent, or Firm* — Harrity & Harrity, LLP

(57) ABSTRACT

A user device receives a captured image of an encoded identifier, analyzes the encoded identifier via the captured image, and extracts, based on the analysis, network access configuration data from the encoded identifier. The user device provides the network access configuration data to a network access control (NAC) device, and receives, based on the network access configuration data, access to the NAC device. The user device permits the NAC device to inspect the user device via the access to the NAC device, and receives, based on the inspection of the user device, access to a network.

25 Claims, 11 Drawing Sheets

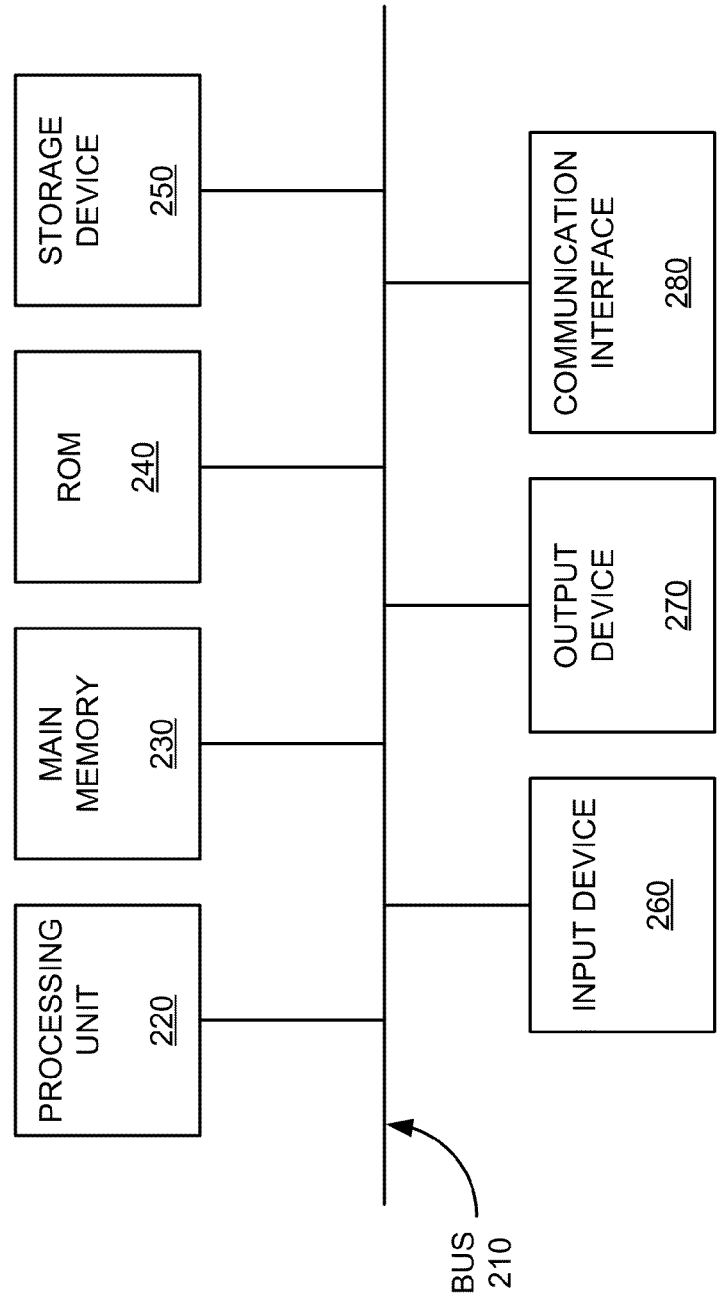

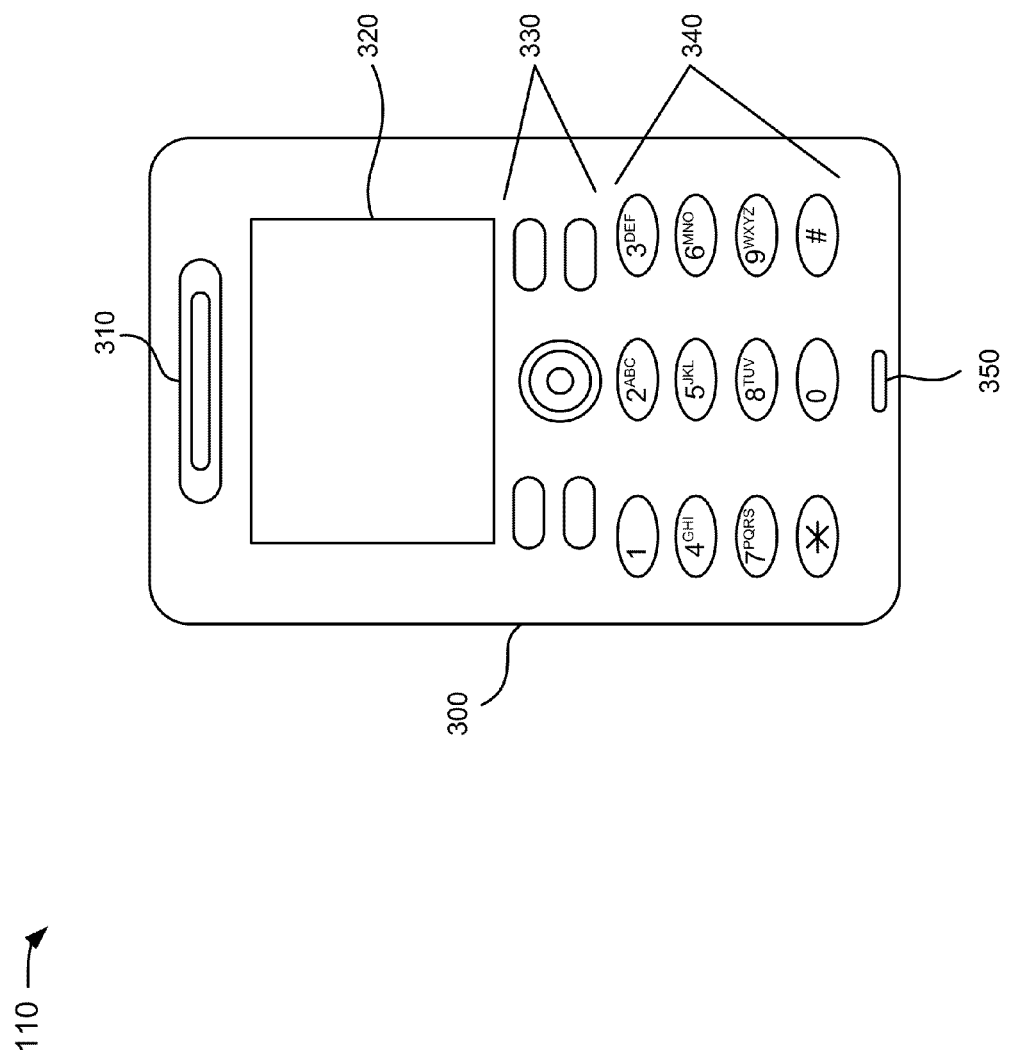

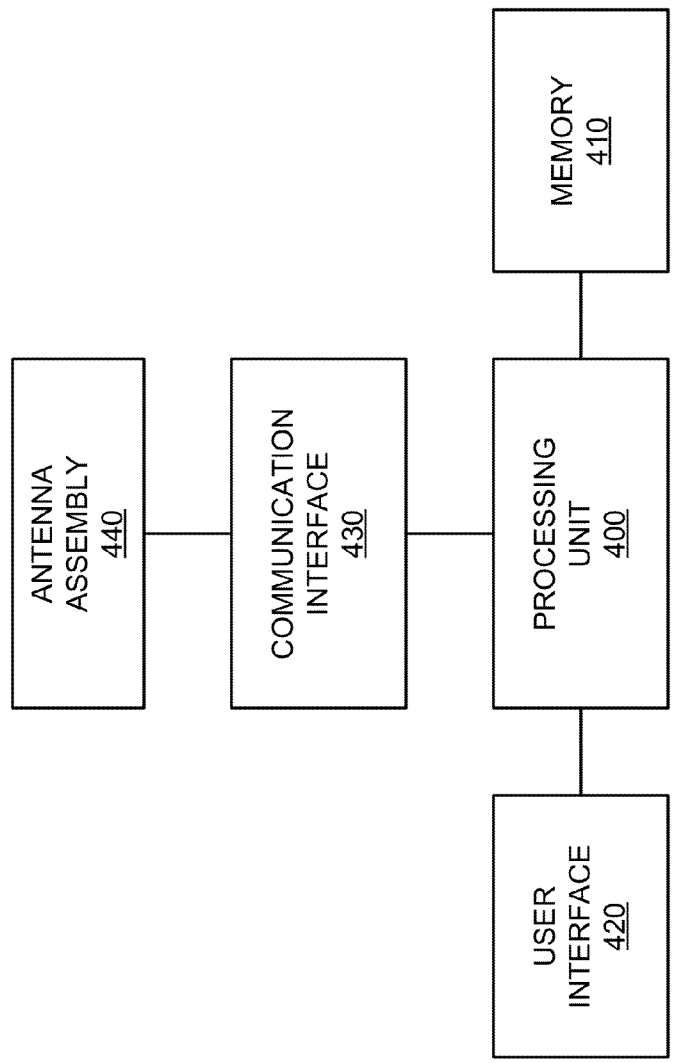

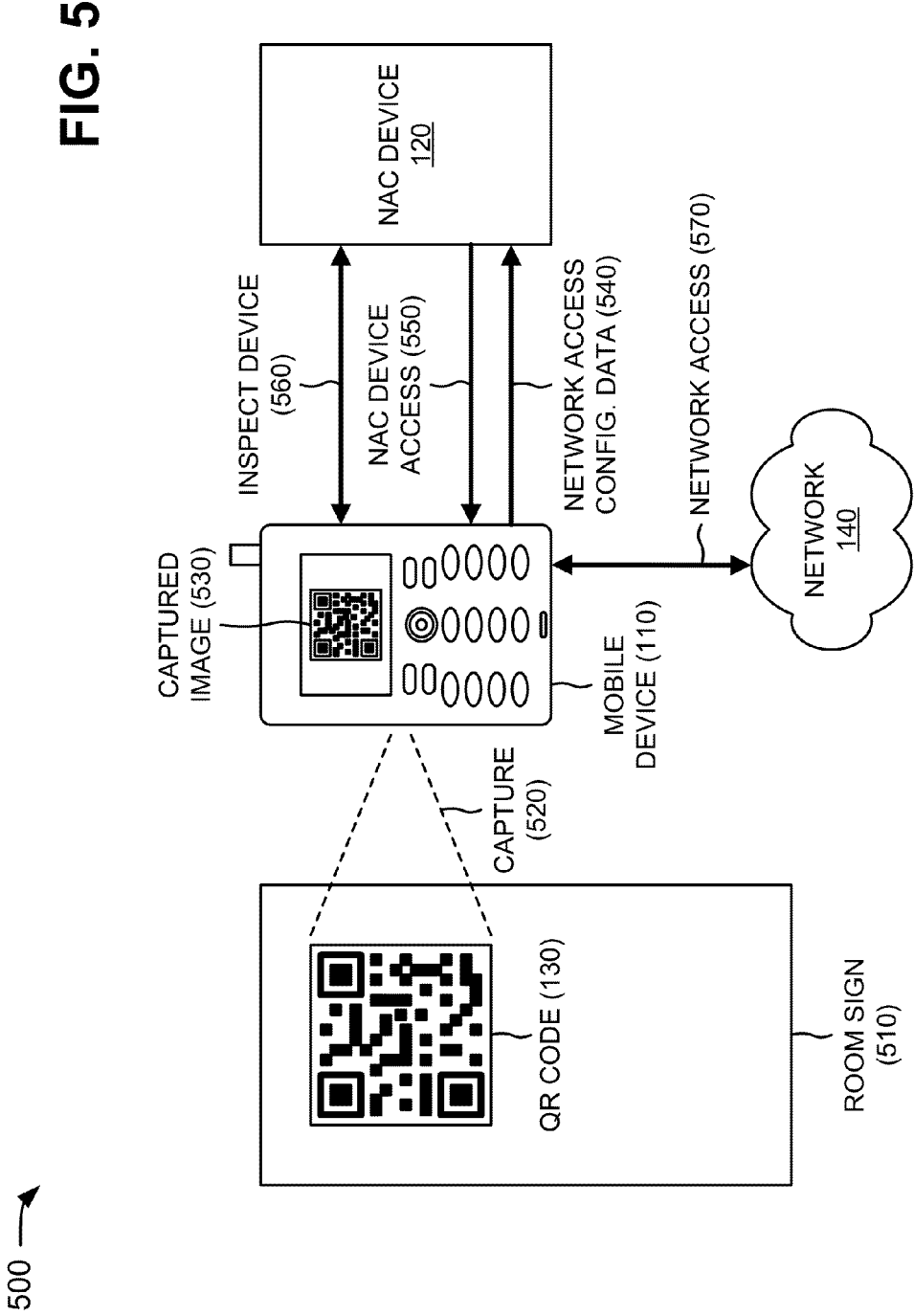

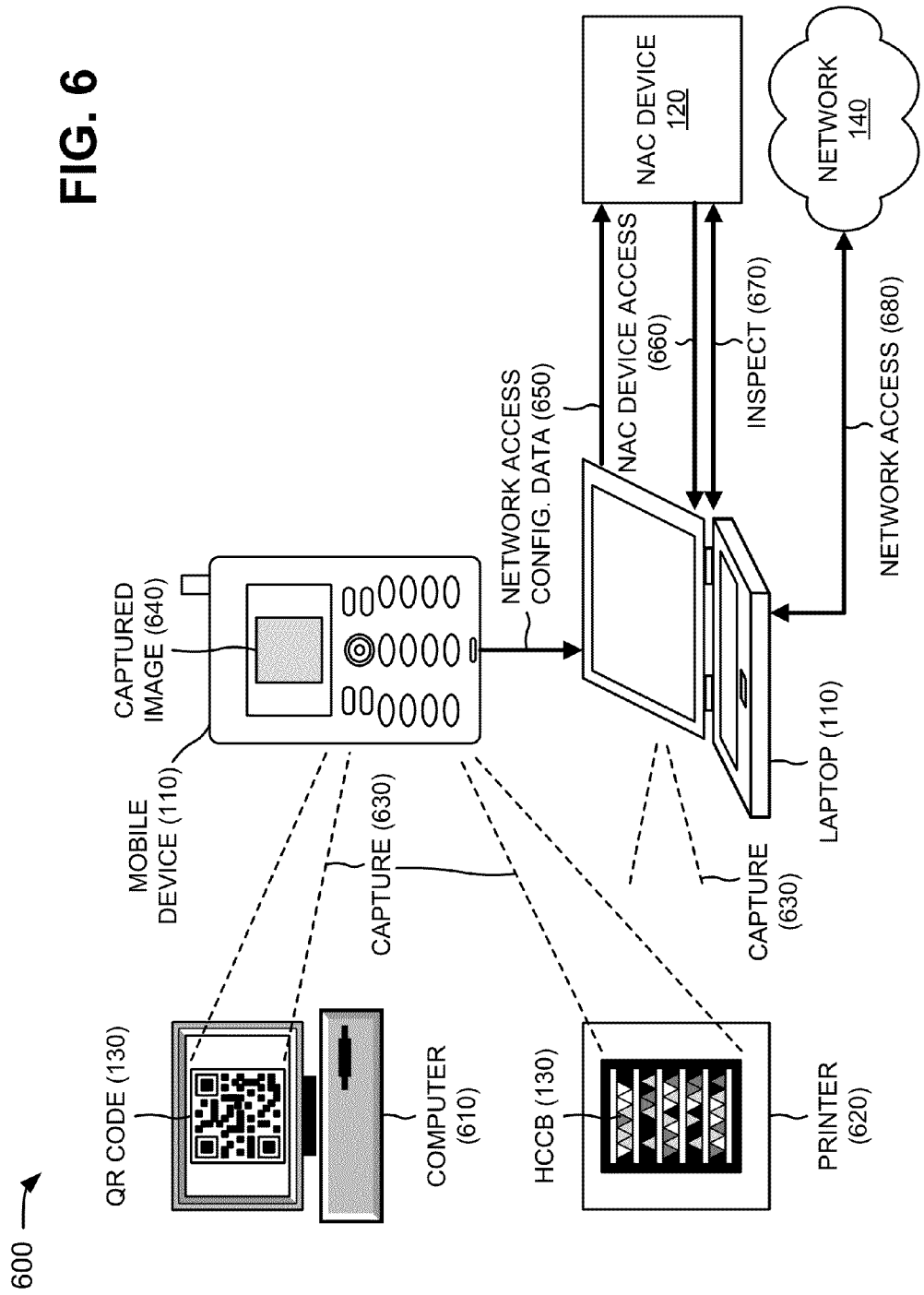

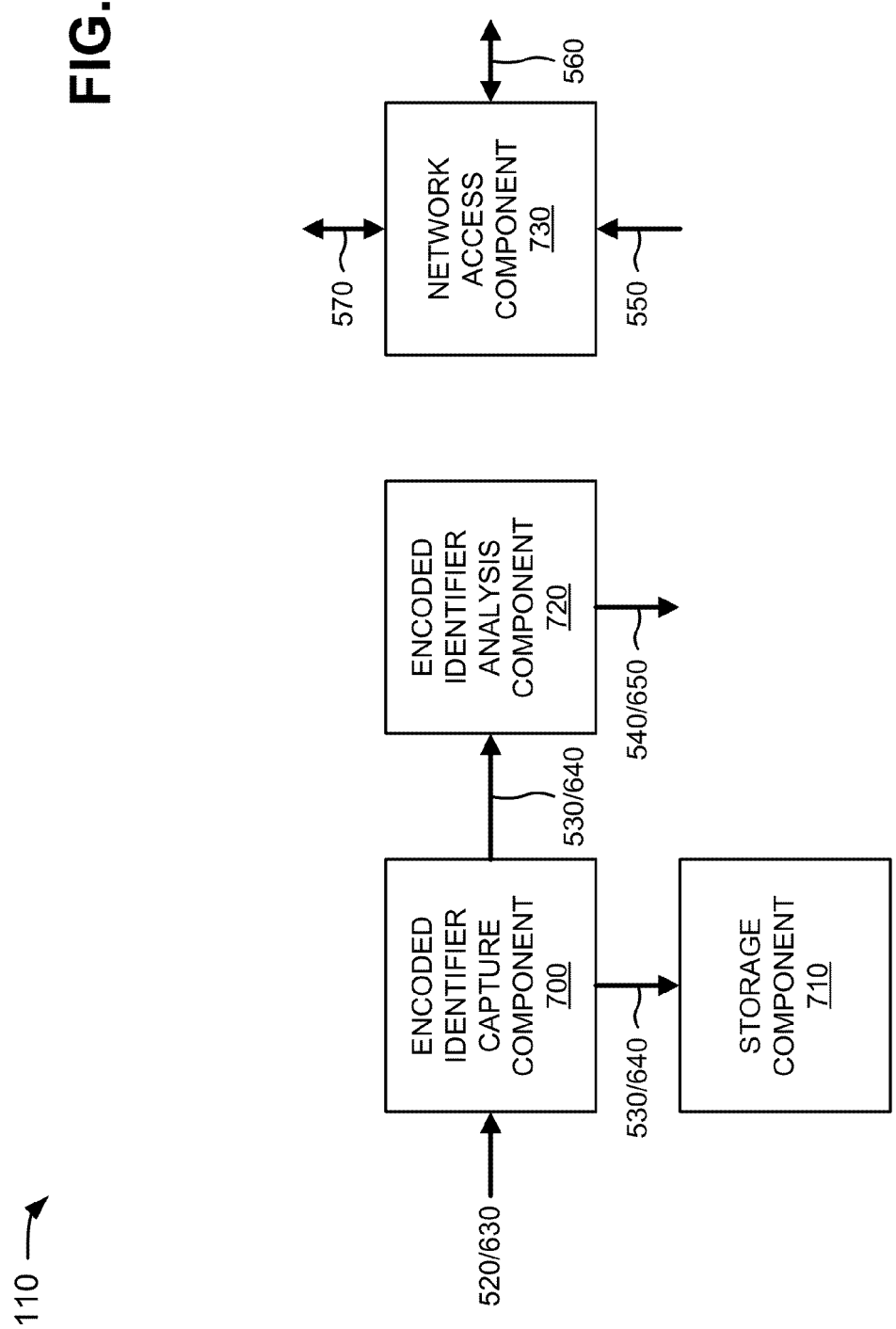

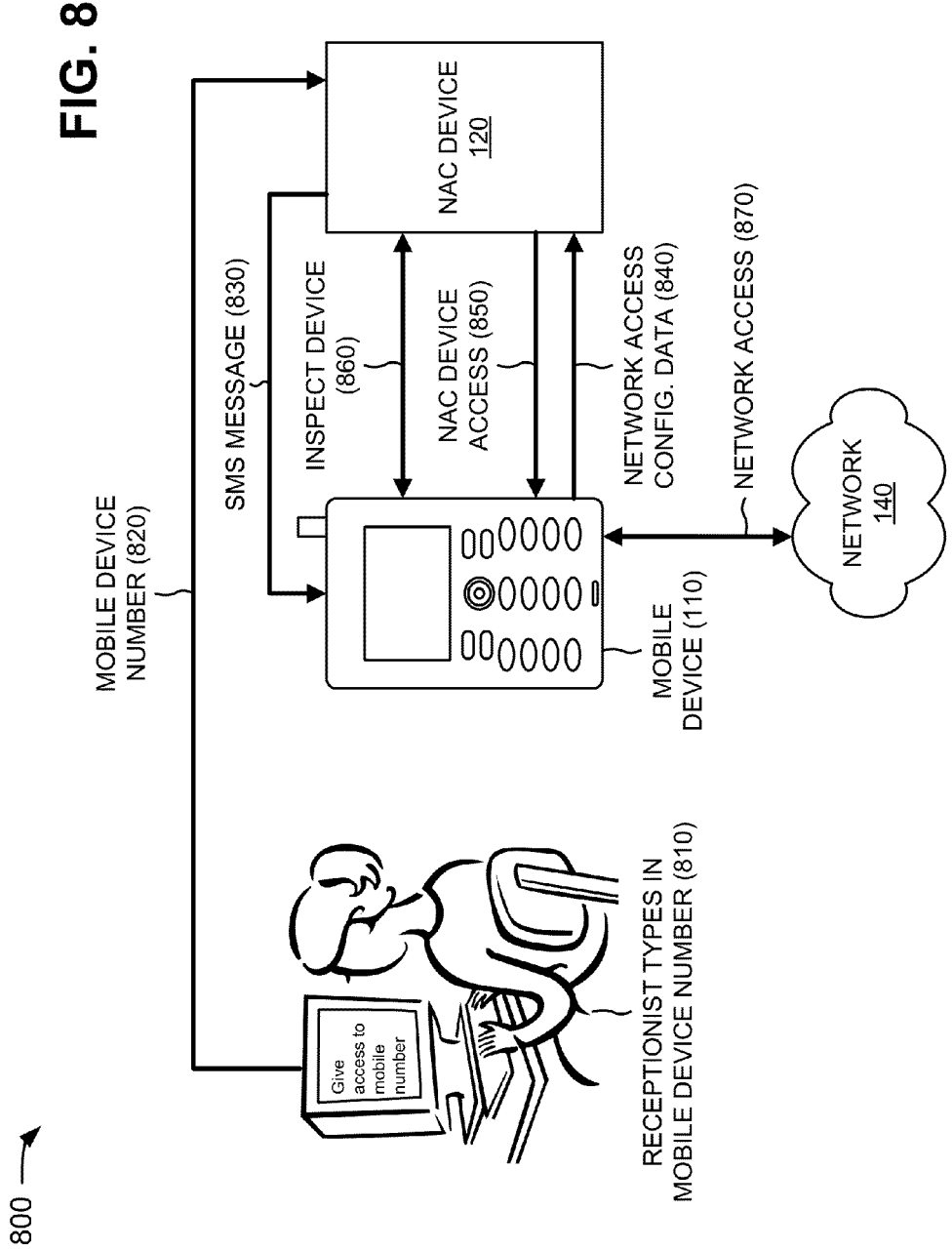

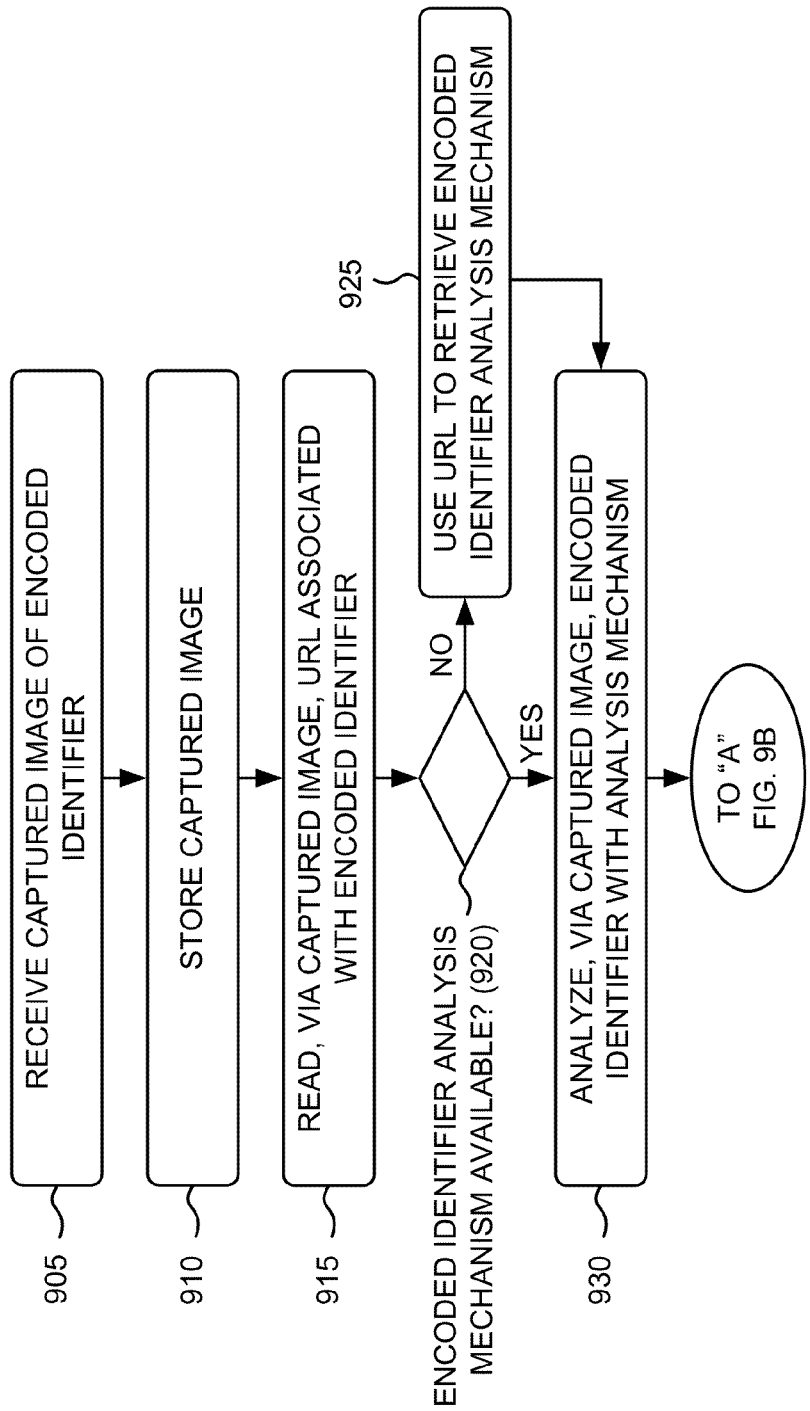

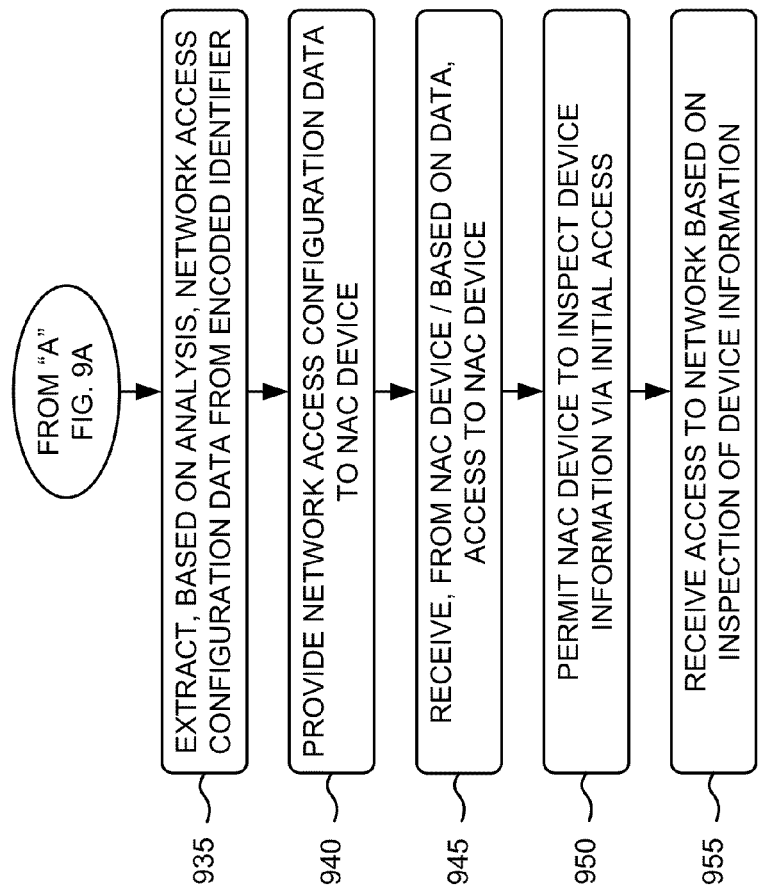

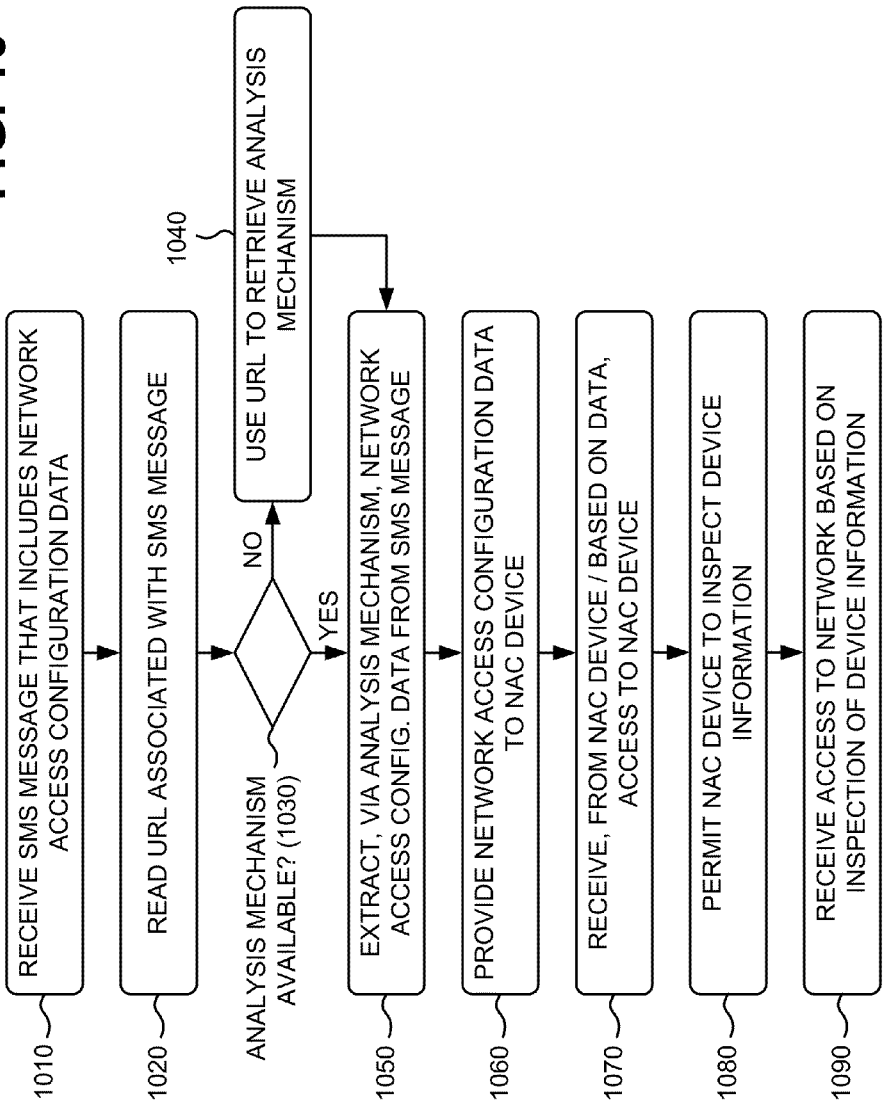

USING ENCODED IDENTIFIERS TO PROVIDE RAPID CONFIGURATION FOR NETWORK ACCESS

BACKGROUND

Network access control (NAC) is a network security approach that attempts to unify endpoint security technology (e.g., antivirus, host intrusion prevention, vulnerability assessment, etc.), user device or system authentication, and network security enforcement. In many scenarios, NAC may be used to provide guest access to networks accounts. For example, a guest (e.g., with a user device, such as a smart phone or laptop computer) may visit a company and may wish to access the Internet via the company's network. In such a situation, the company may provide the guest with temporary, randomly-generated network guest credentials so that the guest's user device may access the Internet via the company's network. The guest access to the network may be provided for a limited time (e.g., a number of hours) and may provide access to only a portion of the company's network. This may prevent the guest from accessing sensitive portions of the company's network (e.g., information systems, email systems, financial information, etc.).

However, entering temporary, randomly-generated network guest credentials into a user device can be a tedious and time consuming process for the guest. The guest may also need to configure software (e.g., required to access a network) for the user device, which may further degrade the user experience.

SUMMARY

According to one aspect, a method may be implemented by a user device. The method may include receiving, by the user device, a captured image of an encoded identifier, analyzing, by the user device and via the captured image, the encoded identifier, and extracting, by the user device and based on the analysis, network access configuration data from the encoded identifier. The method may also include providing, by the user device, the network access configuration data to a network access control (NAC) device, and receiving, by the user device and based on the network access configuration data, access to the NAC device. The method may further include permitting the NAC device to inspect the user device via the access to the NAC device, and receiving, by the user device and based on the inspection of the user device, access to a network.

According to another aspect, a user device may include a memory to store a plurality of instructions, and a processor to execute instructions in the memory to: receive a captured image of an encoded identifier; analyze the encoded identifier via the captured image; extract, based on the analysis, network access configuration data from the encoded identifier; and utilize the network access configuration data to access a network.

According to still another aspect, one or more non-transitory computer-readable media may store instructions executable by one or more processors of a user device. The media may store one or more instructions for storing a captured image of an encoded identifier; analyzing the encoded identifier via the captured image; extracting, based on the analysis, network access configuration data from the encoded identifier; providing the network access configuration data to a network access control (NAC) device; receiving, based on the network access configuration data, access to the NAC device; permitting the NAC device to inspect the user device via the access to the NAC device; and receiving, based on the inspection of the user device, access to a network.

According to a further aspect, a method may be implemented by a user device. The method may include receiving, by the user device and from a network access control (NAC) device, a short message service (SMS) message that includes network access configuration data, and extracting, by the user device, the network access configuration data from the SMS message. The method may also include providing, by the user device, the network access configuration data to the NAC device, and receiving, by the user device and based on the network access configuration data, access to the NAC device. The method may further include permitting the NAC device to inspect the user device via the access to the NAC device, and receiving, by the user device and based on the inspection of the user device, access to a network.

According to still a further aspect, a user device may include a memory to store a plurality of instructions, and a processor to execute instructions in the memory to: receive, from a network access control (NAC) device, a short message service (SMS) message that includes network access configuration data; extract the network access configuration data from the SMS message; and utilize the network access configuration data to access a network.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is a diagram of example components of a network admission control (NAC) device depicted in FIG. 1;

FIG. 3 is a diagram of an example user device of the network illustrated in FIG. 1;

FIG. 4 is a diagram of example components of the user device depicted in FIG. 3;

FIG. 5 is a diagram of example operations capable of being performed by an example portion of the network depicted in FIG. 1;

FIG. 6 is a diagram of example operations capable of being performed by another example portion of the network depicted in FIG. 1;

FIG. 7 is a diagram of example functional components of the user device depicted in FIG. 3;

FIG. 8 is a diagram of example operations capable of being performed by still another example portion of the network depicted in FIG. 1;

FIGS. 9A and 9B depict a flow chart of an example process for using encoded identifiers to provide rapid configuration for network access according to implementations described herein; and FIG. 10 is a flow chart of another example process for using encoded identifiers to provide rapid configuration for network access according to implementations described herein.

DETAILED DESCRIPTION

Figure 1:
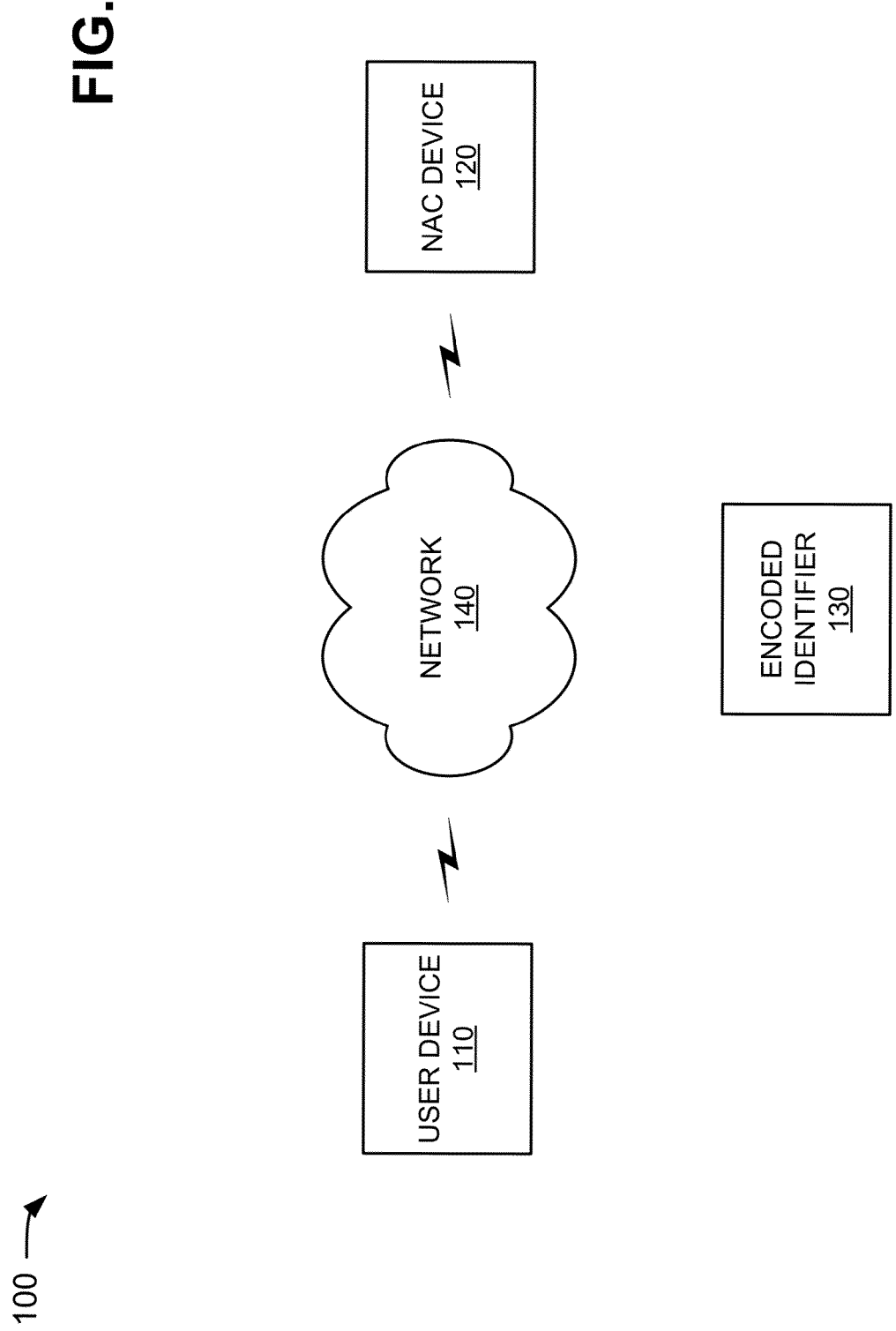
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may use encoded identifiers to enable a user device (e.g., a mobile communication device, such as a smart phone) to quickly and easily access a network. The encoded identifiers may also enable the network to implement network access control (NAC). In one example, the encoded identifier may include a QR code (e.g., a two-dimensional barcode) that may be easily captured by a camera of the user device and may encode network access configuration data (e.g., a service set identifier (SSID) of a NAC device, passwords, certificates, encryption keys, etc.). The user device may analyze the captured QR code, and may extract the network access configuration data from the QR code based on the analysis. The user device may utilize the network access configuration data to access the network (e.g., via a NAC device), without requiring the user to input network guest credentials or to configure software.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "user" or "guest" are intended to be broadly interpreted to include a user device or a user of a user device.

FIG. 1 is a diagram of an example network 100 in which systems and/or methods described herein may be implemented. As illustrated, network 100 may include a user device 110, a NAC device 120, an encoded identifier 130, and a network 140. Components of network 100 may interconnect via wired and/or wireless connections or links. A single user device 110, NAC device 120, encoded identifier device 130, and network 140 have been illustrated in FIG. 1 for simplicity. In practice, there may be more user devices 110, NAC devices 120, encoded identifiers 130, and/or networks 140. Also, in some instances, one or more of the components of network 100 may perform one or more tasks described as being performed by another one or more of the components of network 100.

User device 110 may include any device that is capable of connecting to and communicating with other user devices 110, NAC device 120, and/or network 140. For example, user device 110 may include a mobile communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, etc. In another example, user device 110 may include a laptop computer, a personal computer, a tablet computer, etc.

NAC device 120 may include one or more server devices, or other types of computation or communication devices, that gather, process, search, and/or provide information in a manner described herein. In one implementation, NAC device 120 may attempt to unify endpoint (e.g., user device 110) security technology (e.g., antivirus, host intrusion prevention, vulnerability assessment, etc.), user or system authentication, and network security enforcement. NAC device 120 may use a set of protocols to define and implement a policy that describes how user device 110 are to securely access network 140 when user device 110 attempts to access network 140. NAC device 120 may integrate an automatic remediation process into network 140, allowing the infrastructure (e.g., routers, switches, firewalls, etc.) of network 140 to work with back end servers and endpoint devices (e.g., user device 110) to ensure that network 140 is operating securely before interoperability is permitted.

Encoded identifier 130 may include a mechanism that may encode network access configuration data. The network access configuration data may include, for example, a SSID of network 140; an unencrypted identifier (e.g., an Internet protocol (IP) address) of NAC device 120; cryptographic information; encryption certificates; encryption keys; a password; a username; location information; support information; an access expiration time; and other information that may enable user device 110 to access network 140. In one example, encoded identifier 130 may include a QR code (e.g., a matrix or two-dimensional barcode) that may encode network access configuration data. In another example, encoded identifier 130 may include a high capacity color barcode (HCCB) (e.g., a two-dimensional barcode that uses clusters of colored triangles) that may encode network access configuration data. In still another example, encoded identifier 130 may include another type of mechanism (e.g., a high-density barcode, a radio-frequency identification (RFID), a recorded sound, etc.) that may encode network access configuration data. In a further example, encoded identifier 130 may be replaced with a short message service (SMS) message as described below in connection with FIG. 8.

Encoded identifier 130 may be utilized for accessing a variety of networks, and may be provided in a variety of locations depending on the use of encoded identifier 130. For example, encoded identifier 130 may be displayed on signs (e.g., provided in conference or meeting rooms of a company) to enable user device 110 to be quickly configured for a network available to the conference or meeting rooms. In another example, encoded identifier 130 may be displayed at a reception desk (e.g., in a lobby of a company building) to enable company guests to configure their user devices 110 for use of the company's network (e.g. a WiFi network). In such an arrangement, encoded identifier 130 may be displayed on a sign, a piece of paper, a card, a computer monitor, a television, etc. provided in the lobby. In still another example, encoded identifier 130 may be used to grant WiFi network access to hotel guests, by providing encoded identifier 130 on a medium (e.g., a card, a piece of paper, a room key, a sticker, etc.) to the hotel guest. The hotel guest may utilize user device 110 to capture an image of encoded identifier 130, and to obtain the required WiFi network configuration information (e.g., for accessing the WiFi network). In other implementations, encoded identifier 130 may be utilized with guest access appliance administration portals (e.g., that generate temporary random guest access accounts) for encoding the account usernames, passwords, and configuration data into an easy to capture image.

Network 140 may include one or more networks of any type. For example, network 140 may include a local area network (LAN), a wide area network (WAN), a metropolitan area network (MAN), a telephone network (such as the Public Switched Telephone Network (PSTN), Public Land Mobile Network (PLMN)), a wireless network, an intranet, the Internet, an optical fiber (or fiber optic)-based network, or a combination of networks.

In one example implementation, user device 110 may receive (e.g., via a camera) a captured image of encoded identifier 130, may store the captured image, and may read, via the captured image, a URL associated with encoded identifier 130. User device 110 may determine whether an encoded identifier analysis mechanism (e.g., an application) is available on user device 110, and, when the mechanism is unavailable, may use the URL to retrieve the encoded identifier analysis mechanism. User device 110 may analyze, via the captured image, encoded identifier 130 with the encoded identifier analysis mechanism, and may extract, based on the analysis, network access configuration data (e.g., for accessing network 140) from encoded identifier 130. User device 110 may provide the network access configuration data to NAC device 120, and may receive, from NAC device 120 and based on the network access configuration data, access to NAC device 120. User device 110 may permit NAC device 120 to inspect user device 110 (e.g., to validate, authenticate, authorize, etc. user device 110) via the access to NAC device 120, and may receive access to network 140 based on the inspection of user device 110.

Although FIG. 1 shows an example of components of network 100, in other implementations, network 100 may contain fewer components, different components, differently arranged components, or additional components than depicted in FIG. 1.

FIG. 2 is a diagram of example components of a device 200 that may correspond to NAC device 120. In one example implementation, device 200 may correspond to user device 110 (e.g., when user device 110 is a personal computer, a laptop computer, etc.). As illustrated, device 200 may include a bus 210, a processing unit 220, a main memory 230, a ROM 240, a storage device 250, an input device 260, an output device 270, and a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of an example user device 110 (e.g., a mobile communication device). As illustrated, user device 110 may include a housing 300, a speaker 310, a display 320, control buttons 330, a keypad 340, and a microphone 350. Housing 300 may protect the components of user device 110 from outside elements. Speaker 310 may provide audible information to a user of user device 110.

Display 320 may provide visual information to the user. For example, display 320 may display text input into user device 110; text, images, video, and/or graphics received from another device; and/or information regarding incoming or outgoing calls or text messages, emails, media, games, phone books, address books, the current time, etc. In one example implementation, display 320 may include a touch screen display that may be configured to receive a user input when the user touches display 320. For example, the user may provide an input to display 320 directly, such as via the user's finger, or via other input objects, such as a stylus. User inputs received via display 320 may be processed by components and/or devices operating in user device 110. The touch screen display may permit the user to interact with user device 110 in order to cause user device 110 to perform one or more operations described herein. In one example, the touch screen display may also perform the operations of control buttons 330 and/or keypad 340, and control buttons 330 and/or keypad 340 may be omitted.

Control buttons 330 may permit the user to interact with user device 110 to cause user device 110 to perform one or more operations. For example, control buttons 330 may be used to cause user device 110 to transmit information. Keypad 340 may include a standard telephone keypad. In one example implementation, control buttons 330 and/or keypad 340 may be omitted, and the functionality provided by control buttons 330 and/or keypad 340 may be provided by display 320 (e.g., via a touch screen display). Microphone 350 may receive audible information from the user.

Although FIG. 3 shows example components of user device 110, in other implementations, user device 110 may contain fewer components, different components, differently arranged components, or additional components than depicted in FIG. 3. Alternatively, or additionally, one or more components of user device 110 may perform one or more other tasks described as being performed by one or more other components of user device 110.

FIG. 4 is a diagram of example components of user device 110. As shown, user device 110 may include a processing unit 400, memory 410, a user interface 420, a communication interface 430, and an antenna assembly 440. Components of user device 110 may interconnect via wired and/or wireless connections.

Processing unit 400 may include one or more processors, microprocessors, ASICs, FPGAs, or the like. Processing unit 400 may control operation of user device 110 and its components in a manner described herein.

Memory 410 may include a RAM, a ROM, and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); and/or a vibrator to cause user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As described herein, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of user device 110, in other implementations, user device 110 may contain fewer components, different components, differently arranged components, or additional components than depicted in FIG. 4. Alternatively, or additionally, one or more components of user device 110 may perform one or more other tasks described as being performed by one or more other components of user device 110.

FIG. 5 is a diagram of example operations capable of being performed by an example portion 500 of network 100. As shown, network portion 500 may include a particular type of user device 110 (e.g., a mobile device 110), NAC device 120, a particular type of encoded identifier 130 (e.g., a QR code 130), and network 140. User device 110, NAC device 120, encoded identifier 130, and network 140 may include the features described above in connection with, for example, one or more of FIGS. 1-4.

As further shown in FIG. 5, user device 110 may correspond to mobile device 110 (e.g., a mobile communication device, such as a smart phone with a camera, not shown), and encoded identifier 130 may correspond to QR code 130. QR code 130 may include a matrix barcode (a two-dimensional barcode) that may be read by QR scanners, mobile phones with cameras, smart phones with cameras (e.g., mobile device 110), etc. In one example, QR code 130 may include black modules arranged in a square pattern on a white background. The information encoded by the square pattern may include textual information, URLs, or other data (e.g., network access configuration data). As shown in FIG. 5, QR code 130 may be provided on a room sign 510 (e.g., provided in a lobby of building, a meeting room, a conference room, etc.). In one example implementation, QR code 130 may encode network access configuration data that may be used by mobile device 110 to access a network (e.g., network 140) associated with room sign 510.

Mobile device 110 (e.g., a camera of mobile device 110) may capture an image of QR code 130, as indicated by reference number 520, and mobile device 110 may receive a captured image 530 of QR code 130. In one example, mobile device 110 may display captured image 530 on a display (e.g., display 320, FIG. 3) of mobile device 110 and/or may store captured image 530 in a storage device (e.g., memory 410, FIG. 4) of mobile device 110. Mobile device 110 may read, from captured image 530, an unencrypted URL associated with QR code 130. Mobile device 110 may determine whether mobile device 110 includes an encoded identifier analysis mechanism (e.g., an application) that enables mobile device 110 to analyze information encoded in QR code 130. If mobile device 110 does not include the encoded identifier analysis mechanism, mobile device 110 may utilize the URL (e.g., associated with QR code 130) to retrieve the encoded identifier analysis mechanism from a web site (e.g., an application store) associated with the URL.

Mobile device 110 may analyze, via captured image 530, QR code 130 with the encoded identifier analysis mechanism, and may extract, based on the analysis of QR code 130, network access configuration data 540 from QR code 130. In one example, network access configuration data 540 may include an unencrypted portion and an encrypted portion. The unencrypted portion of network access configuration data 540 may include location information (e.g., a SSID, an IP address, etc.) associated with NAC device 120. The location information may enable mobile device 110 to contact NAC device 120 and exchange certificates (or some other authentication mechanism) with NAC device 120 (e.g., to authenticate mobile device 110). Once mobile device 110 is authenticated by NAC device 120, mobile device 110 may be able to decrypt the encrypted portion of network access configuration data 540. The encrypted portion of network access configuration data 540 may include encryption certificates, encryption keys, a password, a username, location information, support information, an access expiration time, and other information that may enable mobile device 110 to access network 140.

As further shown in FIG. 5, mobile device 110 may provide network access configuration data 540 to NAC device 120 (e.g., based on the location information included in the unencrypted portion of network access configuration data 540). If mobile device 110 is authenticated by NAC device 120, mobile device 110 may be provided access to NAC device 120, as indicated by reference number 550, so that NAC device 120 may inspect mobile device 110. At this point, mobile device 110 may be able to decrypt the encrypted portion of network access configuration data 540. Mobile device 110 may permit NAC device 120 to inspect mobile device 110, as indicated by reference number 560. During the inspection of mobile device 110, NAC device 120 may inspect the information contained in the encrypted portion of network access configuration data 540 and/or information associated with mobile device 110 (e.g., a model of mobile device 110, software configured on mobile device 110, user information, etc.). NAC device 120 may determine whether to authorize mobile device 110 for access to network 140 based on the inspection of the encrypted portion of network access configuration data 540 and/or of the information associated with mobile device 110. If NAC device 120 authorizes mobile device 110 for access to network 140, mobile device 110 may receive access to network 140, as indicated by reference number 570.

In one example implementation, NAC device 120 may utilize receipt of network access configuration data 540 for determining a location associated with mobile device 110. For example, NAC device 120 may know exactly where QR code 130 is located, and mobile device 110 may be situated at the same location as QR code 130 when capturing image 530. Thus, when NAC device 120 receives network access configuration data 540 from mobile device 110, NAC device 120 may infer that mobile device 110 is located at the location of QR code 130.

Although FIG. 5 shows components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

FIG. 6 is a diagram of example operations capable of being performed by another example portion 600 of network 100. As shown, network portion 600 may include two types of user devices 110 (e.g., mobile device 110 and a laptop 110), NAC device 120, two types of encoded identifiers 130 (e.g., QR code 130 and a HCCB 130), and network 140. User devices 110, NAC device 120, encoded identifiers 130, and network 140 may include the features described above in connection with, for example, one or more of FIGS. 1-5.

As further shown in FIG. 6, a first user device 110 may correspond to mobile device 110 (e.g., a mobile communication device, such as a smart phone with a camera, not shown), and a second user device 110 may correspond to laptop 110 (e.g., capable of communicating or synching with mobile device 110). A first encoded identifier 130 may correspond to QR code 130, and a second encoded identifier 130 may correspond to HCCB 130. QR code 130 may include the features described above in connection with FIG. 5, and may encode textual information, URLs, or other data (e.g., network access configuration data). HCCB 130 may include a two-dimensional barcode that encodes information (e.g., textual information, URLs, or network access configuration data) using clusters of colored triangles instead of square pixels. HCCB 130 may encode information using a palette of four or eight colors for the triangles, although HCCB 130 may also use black and white for the triangles. In one example, HCCB 130 may correspond to a Microsoft Tag.

As shown in FIG. 6, QR code 130 may be provided on a monitor of a computer 610 (e.g., provided in a lobby of building, a meeting room, a conference room, etc.). In one example implementation, QR code 130 may encode network access configuration data that may be used by mobile device 110 to access a network (e.g., network 140) associated with computer 610. HCCB 130 may be provided (e.g., as a sticker) on a printer 620 (e.g., provided within a room of a building, a meeting room, a conference room, etc.). In one example implementation, HCCB 130 may encode network access configuration data that may be used by mobile device 110 to access a network (e.g., network 140) associated with printer 620.

Mobile device 110 (e.g., a camera of mobile device 110) may capture an image of QR code 130 or HCCB 130, as indicated by reference numbers 630, and mobile device 110 may receive a captured image 640 of QR code 130 or HCCB 130. In one example, mobile device 110 may display captured image 640 on a display (e.g., display 320, FIG. 3) of mobile device 110 and/or may store captured image 640 in a storage device (e.g., memory 410, FIG. 4) of mobile device 110. Mobile device 110 may read, from captured image 640, an unencrypted URL associated with QR code 130 or HCCB 130. Mobile device 110 may determine whether mobile device 110 includes an encoded identifier analysis mechanism (e.g., an application) that enables mobile device 110 to analyze information encoded in QR code 130 or HCCB 130. If mobile device 110 does not include the encoded identifier analysis mechanism, mobile device 110 may utilize the URL (e.g., associated with QR code 130 or HCCB 130) to retrieve the encoded identifier analysis mechanism from a web site (e.g., an application store) associated with the URL.

Mobile device 110 may analyze, via captured image 640, QR code 130 or HCCB 130 with the encoded identifier analysis mechanism, and may extract, based on the analysis of QR code 130 or HCCB 130, network access configuration data 650 from QR code 130 or HCCB 130. In one example, network access configuration data 650 may include an unencrypted portion and an encrypted portion. The unencrypted portion of network access configuration data 650 may include location information (e.g., a SSID, an IP address, etc.) associated with NAC device 120. The location information may enable mobile device 110 or laptop 110 to contact NAC device 120 and exchange certificates (or some other authentication mechanism) with NAC device 120 (e.g., to authenticate laptop 110). Once mobile device 110 or laptop 110 is authenticated by NAC device 120, mobile device 110 or laptop 110 may be able to decrypt the encrypted portion of network access configuration data 650. The encrypted portion of network access configuration data 650 may include encryption certificates, encryption keys, a password, a username, location information, support information, an access expiration time, and other information that may enable mobile device 110 or laptop 110 to access network 140.

As further shown in FIG. 6, mobile device 110 may provide network access configuration data 650 to laptop 110 (e.g., via an active synch with laptop 110). Laptop 110 may receive network access configuration data 650 and may provide network access configuration data 650 to NAC device 120 (e.g., based on the location information included in the unencrypted portion of network access configuration data 650). If laptop 110 is authenticated by NAC device 120, laptop 110 may be provided access to NAC device 120, as indicated by reference number 660, so that NAC device 120 may inspect laptop 110. At this point, laptop 110 may be able to decrypt the encrypted portion of network access configuration data 650. Laptop 110 may permit NAC device 120 to inspect laptop 110, as indicated by reference number 670. During the inspection of laptop 110, NAC device 120 may inspect the information contained in the encrypted portion of network access configuration data 650 and/or information associated with laptop 110. NAC device 120 may determine whether to authorize laptop 110 for access to network 140 based on the inspection of the encrypted portion of network access configuration data 650 or on the information associated with laptop 110. If NAC device 120 authorizes laptop 110 for access to network 140, laptop 110 may receive access to network 140, as indicated by reference number 680.

Although FIG. 6 shows components of network portion 600, in other implementations, network portion 600 may contain fewer components, different components, differently arranged components, or additional components than depicted in FIG. 6. Alternatively, or additionally, one or more components of network portion 600 may perform one or more other tasks described as being performed by one or more other components of network portion 600. For example, mobile device 110 may be omitted from network portion 600 and laptop 110 (e.g., a webcam of laptop 110) may capture an image (e.g., captured image 640) of QR code 130 or HCCB 130. In such a scenario, laptop 110 may extract network access configuration data 650 from captured image 640 and may utilize network access configuration data 650 to obtain access to network 140, as described above.

FIG. 7 is a diagram of example functional components of user device 110. In one example, the functional components described in connection with FIG. 7 may be implemented by one or more of the components depicted in FIG. 4. As shown in FIG. 7, user device 110 may include an encoded identifier capture component 700, a storage component 710, an encoded identifier analysis component 720, and a network access component 730.

Encoded identifier capture component 700 may include hardware or a combination of hardware and software that may receive an image captured by a camera associated with user device 110. For example, encoded identifier capture component 700 may capture an image of QR code 130 or HCCB 130, as indicated by reference numbers 520 and 630. As further shown in FIG. 7, encoded identifier capture component 700 may provide captured images 530/640 of QR code 130 or HCCB 130 to storage component 710 (e.g., for storage) and to encoded identifier analysis component 720 (e.g., for processing).

Storage component 710 may include hardware or a combination of hardware and software that may receive captured images 530/640 from encoded identifier capture component 700 and may store captured images 530/640. In one example, encoded identifier capture component 700 may not provide captured images 530/640 to encoded identifier analysis component 720. Instead, encoded identifier analysis component 720 may retrieve captured images 530/640 from storage component 710.

Encoded identifier analysis component 720 may include hardware or a combination of hardware and software that may receive captured images 530/640 from encoded identifier capture component 700, and may parse captured images 530/640. Encoded identifier analysis component 720 may extract the unencrypted and encrypted portions of network access configuration data 540/650 from the parsed captured images 530/540, and may decrypt the encrypted portion of network access configuration data 540/650. In one example, encoded identifier analysis component 720 may provide network access configuration data 540 to NAC device 120. In another example, encoded identifier analysis component 720 may provide network access configuration data 650 to another user device 110 (e.g., laptop 110, FIG. 6).

Network access component 730 may include hardware or a combination of hardware and software that may receive access 550 to NAC device 120, and may permit NAC device 120 to inspect user device 110, as indicated by reference number 560. NAC device 120 may determine whether to authorize user device 110 for access to network 140 based on the inspection of the encrypted portion of network access configuration data 540 and/or of information associated with user device 110. If NAC device 120 authorizes user device 110 for access to network 140, network access component 730 may receive access to network 140, as indicated by reference number 570.

Although FIG. 7 shows example functional components of user device 110, in other implementations, user device 110 may contain fewer functional components, different functional components, differently arranged functional components, or additional functional components than depicted in FIG. 7. Alternatively, or additionally, one or more functional components of user device 110 may perform one or more other tasks described as being performed by one or more other functional components of user device 110.

FIG. 8 is a diagram of example operations capable of being performed by still another example portion 800 of network 100. As shown, network portion 800 may include a type of user device 110 (e.g., mobile device 110), NAC device 120, and network 140. User device 110, NAC device 120, and network 140 may include the features described above in connection with, for example, one or more of FIGS. 1-7.

As further shown in FIG. 8, user device 110 may correspond to mobile device 110 (e.g., a mobile communication device, such as a smart phone with a camera, not shown). Encoded identifier 130 may be omitted from the scenario depicted in FIG. 8. However, a user of mobile device 110 may provide a mobile number (e.g., a telephone number) associated with mobile device 110 to a receptionist (e.g., of a company). The receptionist may type in the mobile number of mobile device 110 (e.g., to a computer connected to NAC device 120), as indicated by reference number 810, in order to request access to network 140 for mobile device 110. The computer connected to NAC device 120 may provide a mobile device number 820 (e.g., typed in by the receptionist) to NAC device 120.

NAC device 120 may receive mobile device number 820 from the receptionist's computer, and may provide a SMS message 830 (or another type of message, such as an instant message) to the device (e.g., mobile device 110) associated with mobile device number 820. SMS message 830 may include encoded information, such as textual information, URLs, or other data (e.g., network access configuration data). In one example implementation, SMS message 830 may encode network access configuration data that may be used by mobile device 110 to access a network (e.g., network 140) associated with NAC device 120.

Mobile device 110 may receive SMS message 830 and/or may store SMS message 830 in a storage device (e.g., memory 410, FIG. 4) of mobile device 110. Mobile device 110 may read, via SMS message 830, a URL associated with SMS message 830. Mobile device 110 may determine whether mobile device 110 includes an analysis mechanism (e.g., an application) that enables mobile device 110 to analyze information encoded in SMS message 830. If mobile device 110 does not include the analysis mechanism, mobile device 110 may utilize the URL (e.g., associated with SMS message 830) to retrieve the analysis mechanism from a web site (e.g., an application store) associated with the URL.

Mobile device 110 may extract, via the analysis mechanism, network access configuration data 840 from SMS message 830. In one example, network access configuration data 840 may include an unencrypted portion and an encrypted portion. The unencrypted portion of network access configuration data 840 may include location information (e.g., a SSID, an IP address, etc.) associated with NAC device 120. The location information may enable mobile device 110 to contact NAC device 120 and exchange certificates (or some other authentication mechanism) with NAC device 120 (e.g., to authenticate mobile device 110). Once mobile device 110 is authenticated by NAC device 120, mobile device 110 may be able to decrypt the encrypted portion of network access configuration data 840. The encrypted portion of network access configuration data 840 may include encryption certificates, encryption keys, a password, a username, location information, support information, an access expiration time, and other information that may enable mobile device 110 to access network 140.

As further shown in FIG. 8, mobile device 110 may provide network access configuration data 840 to NAC device 120 (e.g., based on the location information included in the unencrypted portion of network access configuration data 840). If mobile device 110 is authenticated by NAC device 120, mobile device 110 may be provided access to NAC device 120, as indicated by reference number 850, so that NAC device 120 may inspect mobile device 110. At this point, mobile device 110 may be able to decrypt the encrypted portion of network access configuration data 840. Mobile device 110 may permit NAC device 120 to inspect mobile device 110, as indicated by reference number 860. During the inspection of mobile device 110, NAC device 120 may inspect the information contained in the encrypted portion of network access configuration data 840 and/or information associated with mobile device 110 (e.g., a model of mobile device 110, software configured on mobile device 110, user information, etc.). NAC device 120 may determine whether to authorize mobile device 110 for access to network 140 based on the inspection of the encrypted portion of network access configuration data 840 and/or of the information associated with mobile device 110. If NAC device 120 authorizes mobile device 110 for access to network 140, mobile device 110 may receive access to network 140, as indicated by reference number 870.

Although FIG. 8 shows components of network portion 800, in other implementations, network portion 800 may contain fewer components, different components, differently arranged components, or additional components than depicted in FIG. 8. Alternatively, or additionally, one or more components of network portion 800 may perform one or more other tasks described as being performed by one or more other components of network portion 800.

FIGS. 9A and 9B depict a flow chart of an example process 900 for using encoded identifiers to provide rapid configuration for network access according to implementations described herein. In one implementation, process 900 may be performed by user device 110. In another implementation, some or all of process 900 may be performed by another device or group of devices, including or excluding user device 110.

As illustrated in FIG. 9A, process 900 may include receiving a captured image of an encoded identifier (block 905), storing the captured image (block 910), and reading, via the captured image, a URL associated with the encoded identifier (block 915). For example, in implementations described above in connection with FIG. 5, mobile device 110 (e.g., a camera of mobile device 110) may capture an image of QR code 130, as indicated by reference number 520, and mobile device 110 may receive captured image 530 of QR code 130. In one example, mobile device 110 may display captured image 530 on a display (e.g., display 320, FIG. 3) of mobile device 110 and/or may store captured image 530 in a storage device (e.g., memory 410, FIG. 4) of mobile device 110. Mobile device 110 may read, via captured image 530, a URL associated with QR code 130.

As further shown in FIG. 9A, process 900 may include determining whether an encoded identifier analysis mechanism is available (block 920). If the encoded identifier analysis mechanism is not available (block 920—NO), process 900 may include using the URL to retrieve the encoded identifier analysis mechanism (block 925). If the encoded identifier analysis mechanism is available (block 920—YES) or is retrieved (block 925), process 900 may include analyzing, via the captured image, the encoded identifier with the encoded identifier analysis mechanism (block 930). For example, in implementations described above in connection with FIG. 5, mobile device 110 may determine whether mobile device 110 includes an encoded identifier analysis mechanism (e.g., an application) that enables mobile device 110 to analyze information encoded in QR code 130. If mobile device 110 does not include the encoded identifier analysis mechanism, mobile device 110 may utilize the URL (e.g., associated with QR code 130) to retrieve the encoded identifier analysis mechanism from a web site (e.g., an application store) associated with the URL. Mobile device 110 may analyze, via captured image 530, QR code 130 with the encoded identifier analysis mechanism.

As shown in FIG. 9B, process 900 may include extracting, based on the analysis, network access configuration data from the encoded identifier (block 935), providing the network access configuration data to a NAC device (block 940), and receiving, from the NAC device and based on the network access configuration data, access to the NAC device (block 945). For example, in implementations described above in connection with FIG. 5, mobile device 110 may extract, based on the analysis of QR code 130, network access configuration data 540 from QR code 130. In one example, network access configuration data 540 may include an unencrypted portion and an encrypted portion. Mobile device 110 may provide network access configuration data 540 to NAC device 120 (e.g., based on the location information included in the unencrypted portion of network access configuration data 540). If mobile device 110 is authenticated by NAC device 120, mobile device 110 may be provided access to NAC device 120, as indicated by reference number 550, so that NAC device 120 may inspect mobile device 110.

As further shown in FIG. 9B, process 900 may include permitting the NAC device to inspect device information via the initial access (block 950), and receiving access to a network based on the inspection of the device information (block 955). For example, in implementations described above in connection with FIG. 5, mobile device 110 may permit NAC device 120 to inspect mobile device 110, as indicated by reference number 560. During the inspection of mobile device 110, NAC device 120 may inspect the information contained in the encrypted portion of network access configuration data 540 and/or information associated with mobile device 110 (e.g., a model of mobile device 110, software configured on mobile device 110, user information, etc.). NAC device 120 may determine whether to authorize mobile device 110 for access to network 140 based on the inspection of the encrypted portion of network access configuration data 540 and/or of the information associated with mobile device 110. If NAC device 120 authorizes mobile device 110 for access to network 140, mobile device 110 may receive access to network 140, as indicated by reference number 570.

FIG. 10 is a flow chart of another example process 1000 for using encoded identifiers to provide rapid configuration for network access according to implementations described herein. In one implementation, process 1000 may be performed by user device 110. In another implementation, some or all of process 1000 may be performed by another device or group of devices, including or excluding user device 110.

As illustrated in FIG. 10, process 1000 may include receiving a SMS message that includes network access configuration data (block 1010), and reading a URL associated with the SMS message (block 1020). For example, in implementations described above in connection with FIG. 8, mobile device 110 may receive SMS message 830 (e.g., from NAC device 120) and/or may store SMS message 830 in a storage device (e.g., memory 410, FIG. 4) of mobile device 110. Mobile device 110 may read, via SMS message 830, a URL associated with SMS message 830. SMS message 830 may include encoded information, such as textual information, URLs, or other data (e.g., network access configuration data). In one example, SMS message 830 may encode network access configuration data that may be used by mobile device 110 to access a network (e.g., network 140) associated with NAC device 120.

As further shown in FIG. 10, process 1000 may include determining whether an analysis mechanism is available (block 1030). If the analysis mechanism is not available (block 1030—NO), process 1000 may include using the URL to retrieve the analysis mechanism (block 1040). If the analysis mechanism is available (block 1030—YES) or is retrieved (block 1040), process 1000 may include extracting, via the analysis mechanism, the network access configuration data from the SMS message (block 1050). For example, in implementations described above in connection with FIG. 8, mobile device 110 may determine whether mobile device 110 includes an analysis mechanism (e.g., an application) that enables mobile device 110 to analyze information encoded in SMS message 830. If mobile device 110 does not include the analysis mechanism, mobile device 110 may utilize the URL (e.g., associated with SMS message 830) to retrieve the analysis mechanism from a web site (e.g., an application store) associated with the URL. Mobile device 110 may extract, via the analysis mechanism, network access configuration data 840 from SMS message 830. In one example, network access configuration data 840 may include an unencrypted portion and an encrypted portion.

Returning to FIG. 10, process 1000 may include providing the network access configuration data to a NAC device (block 1060), and receiving, from the NAC device, and based on the network access configuration data, access to the NAC device (block 1070). For example, in implementations described above in connection with FIG. 8, mobile device 110 may provide network access configuration data 840 to NAC device 120 (e.g., based on the location information included in the unencrypted portion of network access configuration data 840). If mobile device 110 is authenticated by NAC device 120, mobile device 110 may be provided access to NAC device 120, as indicated by reference number 850, so that NAC device 120 may inspect mobile device 110. At this point, mobile device 110 may be able to decrypt the encrypted portion of network access configuration data 840.

As further shown in FIG. 10, process 1000 may include permitting the NAC device to inspect device information via the initial access (block 1080), and receiving access to a network based on the inspection of the device information (block 1090). For example, in implementations described above in connection with FIG. 8, mobile device 110 may permit NAC device 120 to inspect mobile device 110, as indicated by reference number 860. During the inspection of mobile device 110, NAC device 120 may inspect the information contained in the encrypted portion of network access configuration data 840 and/or information associated with mobile device 110. NAC device 120 may determine whether to authorize mobile device 110 for access to network 140 based on the inspection of the encrypted portion of network access configuration data 840 and/or of the information associated with mobile device 110. If NAC device 120 authorizes mobile device 110 for access to network 140, mobile device 110 may receive access to network 140, as indicated by reference number 870.

Systems and/or methods described herein may use encoded identifiers to enable a user device (e.g., a mobile communication device, such as a smart phone) to quickly and easily access a network, and may enable the network to implement NAC. In one example, the encoded identifier may include a QR code that may be easily captured by a camera of the user device and may encode network access configuration data. The user device may analyze the captured QR code, and may extract the network access configuration data from the QR code based on the analysis. The user device may utilize the network access configuration data to access the network (e.g., via a NAC device), without requiring the user to input network guest credentials or to configure software.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9A-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising: receiving, by a user device, a captured image of an encoded identifier; analyzing, by the user device and via the captured image, the encoded identifier; extracting, by the user device and based on analyzing the encoded identifier, network access configuration data from the encoded identifier, the network access configuration data including one or more of location information of a network access control (NAC) device, an encryption key, a password, a certificate, or an expiration time; providing, by the user device, the network access configuration data to the NAC device; receiving, by the user device and based on the network access configuration data, access to the NAC device; permitting the NAC device to inspect the user device via the access to the NAC device; and receiving, by the user device and after the NAC device inspects the user device, access to a network.

2. The method of claim 1, where the encoded identifier includes a QR code or a high capacity color barcode (HCCB).

3. The method of claim 1, where the network access configuration data includes an unencrypted portion and an encrypted portion.

4. The method of claim 3, where: the unencrypted portion of the network access configuration data includes the location information of the NAC device, and the encrypted portion of the network access configuration data includes particular information that enables the user device to access the network, and the particular information includes one or more of the encryption key, the password, or the certificate.

5. The method of claim 1, further comprising: reading, via the captured image, a uniform resource location (URL) associated with the encoded identifier; determining whether an encoded identifier analysis mechanism is provided in the user device; and utilizing the URL to retrieve the encoded identifier analysis mechanism when the encoded identifier analysis mechanism is not provided in the user device, analyzing the encoded identifier including: analyzing the encoded identifier by using the encoded identifier analysis mechanism.

6. The method of claim 1, further comprising: providing the network access configuration data to another user device, the network access configuration data enabling the other user device to access the network.

7. A user device comprising: a memory to store a plurality of instructions; and a processor to execute the plurality of instructions in the memory to: receive an image of an encoded identifier, analyze the encoded identifier, extract, based on analyzing the encoded identifier, network access configuration data from the encoded identifier, the network access configuration data including one or more of location information of a network access control (NAC) device, an encryption key, a password, a certificate, or an expiration time, and utilize the network access configuration data to access a network.

8. The user device of claim 7, where, when utilizing the network access configuration data, the processor is to execute the plurality of instructions in the memory to: provide the network access configuration data to the NAC device, receive, based on the network access configuration data, access to the NAC device, permit the NAC device to inspect the user device, and receive, after the NAC device inspects the user device, access to the network.

9. The user device of claim 7, where the encoded identifier includes a QR code or a high capacity color barcode (HCCB).

10. The user device of claim 8, where the network access configuration data includes an unencrypted portion and an encrypted portion.

11. The user device of claim 10, where: the unencrypted portion of the network access configuration data includes the location information of the NAC device, and the encrypted portion of the network access configuration data includes one or more of the encryption key, the password, the certificate, or the expiration time.

12. The user device of claim 7, where the processor is further to execute the plurality of instructions in the memory to: read, from the image, a uniform resource location (URL) associated with the encoded identifier, determine whether an encoded identifier analysis mechanism is provided in the user device, and utilize the URL to retrieve the encoded identifier analysis mechanism when the encoded identifier analysis mechanism is not provided in the user device, and where, when analyzing the encoded identifier, the processor is to execute the plurality of instructions in the memory to: analyze the encoded identifier by using the encoded identifier analysis mechanism.

13. The user device of claim 7, where the processor is further to execute the plurality of instructions in the memory to: provide the network access configuration data to another user device, and where the network access configuration data enables the other user device to access the network.

14. A non-transitory computer-readable media storing instructions, the instructions comprising: one or more instructions that, when executed by one or more processors of a user device, cause the one or more processors to: store an image of an encoded identifier; analyze the encoded identifier stored on the image; extract, based on analyzing the encoded identifier, network access configuration data from the encoded identifier, the network access configuration data including one or more of location information of a network access control (NAC) device, an encryption key, a password, a certificate, or an expiration time; provide the network access configuration data to the NAC device; receive, based on the network access configuration data, access to the NAC device; permit the NAC device to inspect the user device via the access to the NAC device; and receive, after the NAC device inspects the user device, access to a network.

15. The non-transitory computer-readable media of claim 14, where the encoded identifier includes a QR code or a high capacity color barcode (HCCB).

16. The non-transitory computer-readable media of claim 14, where the network access configuration data includes: an unencrypted portion that includes the location information of the NAC device, and an encrypted portion that includes one or more of the encryption key, the password, the certificate, or the expiration time.

17. The non-transitory computer-readable media of claim 14, where the instructions further comprise: one or more instructions that, when executed by the one or more processors, cause the one or more processors to: read, from the image, a uniform resource location (URL) associated with the encoded identifier; determine whether an encoded identifier analysis mechanism is provided in the user device; and utilize the URL to retrieve the encoded identifier analysis mechanism when the encoded identifier analysis mechanism is not provided in the user device, and where the one or more instructions to analyze the encoded identifier include: one or more instructions that, when executed by the one or more processors, cause the one or more processors to: analyze the encoded identifier based on the encoded identifier analysis mechanism.

18. The non-transitory computer-readable media of claim 14, where the instructions further comprise: one or more instructions that, when executed by the one or more processors, cause the one or more processors to: provide the network access configuration data to another user device, and where the network access configuration data enables the other user device to access the network.

19. A method comprising: receiving, by a user device and from a network access control (NAC) device, a short message service (SMS) message; extracting, by the user device, network access configuration data from the SMS message, the network access configuration data including one or more of location information of the NAC device, an encryption key, a password, a certificate, or an expiration time; providing, by the user device, the network access configuration data to the NAC device; receiving, by the user device and based on the network access configuration data, access to the NAC device; permitting the NAC device to inspect the user device via the access to the NAC device; and receiving, by the user device and after the NAC device inspects the user device, access to a network.

20. The method of claim 19, where the SMS message is generated by the NAC device based on receipt of a telephone number associated with the user device.

21. The method of claim 19, further comprising: reading a uniform resource location (URL) associated with the SMS message; determining whether an analysis mechanism is provided in the user device; and utilizing the URL to retrieve the analysis mechanism when the analysis mechanism is not provided in the user device, the analysis mechanism including information required to extract the network access configuration data from the SMS message.

22. The method of claim 19, further comprising: providing the network access configuration data to another user device, the network access configuration data enabling the other user device to access the network.

23. A user device comprising: a memory; and a processor to: receive, from a network access control (NAC) device, a short message service (SMS) message, extract network access configuration data from the SMS message, the network access configuration data including one or more of location information of the NAC device, an encryption key, a password, a certificate, or an expiration time, and utilize the network access configuration data to access a network.

24. The user device of claim 23, where, when utilizing the network access configuration data, the processor is to: provide the network access configuration data to the NAC device, receive, based on the network access configuration data, access to the NAC device, permit the NAC device to inspect the user device via the access to the NAC device, and receive, after the NAC device inspects the user device, access to the network.

25. The user device of claim 23, where the processor is to: provide the network access configuration data to another user device, and where the network access configuration data enables the other user device to access the network.

* * * * *